United States Patent [19]

Tsuji et al.

[11] Patent Number: 5,332,608
[45] Date of Patent: Jul. 26, 1994

[54] INFORMATION RECORDING MEDIUM

[75] Inventors: Taishi Tsuji; Yasushi Araki; Atsushi Yoshizawa; Fumio Matsui, all of Tsurugashma, Japan

[73] Assignee: Pioneer Electronic Corporation, Tokyo, Japan

[21] Appl. No.: 106,657

[22] Filed: Aug. 16, 1993

[30] Foreign Application Priority Data

Aug. 27, 1992 [JP] Japan .................................. 4-228376

[51] Int. Cl.$^5$ ............................................. B32B 3/00
[52] U.S. Cl. ....................................... 428/64; 428/65; 428/913; 430/270; 430/945; 346/76 L; 346/135.1; 369/288
[58] Field of Search ............................. 428/64, 65, 913; 430/270, 945; 346/76 L, 135.1; 369/288

[56] References Cited

U.S. PATENT DOCUMENTS

| | | | |
|---|---|---|---|
| 4,873,131 | 10/1989 | Kashima et al. | 428/64 |
| 4,977,064 | 12/1990 | Sukawa et al. | 430/270 |
| 4,987,021 | 1/1991 | Kanno et al. | 428/64 |
| 4,999,281 | 3/1991 | Inagaki et al. | 430/270 |
| 5,017,414 | 5/1991 | Gregg | 428/64 |
| 5,079,135 | 1/1992 | Matsuzawa et al. | 430/945 |
| 5,080,946 | 4/1992 | Takagasi et al. | 428/64 |
| 5,161,150 | 11/1992 | Namba et al. | 369/275.4 |

Primary Examiner—Patrick J. Ryan
Assistant Examiner—Elizabeth Evans
Attorney, Agent, or Firm—Sughrue, Mion, Zinn, Macpeak & Seas

[57] ABSTRACT

Disclosed is an information recording medium having a recording layer which contains a benzotriazole type compound. This information recording medium therefore exhibits very excellent effects in light resistance and is safe to use.

4 Claims, 1 Drawing Sheet

INFORMATION RECORDING MEDIUM

BACKGROUND OF THE INVENTION

1. Field of the Invention

The present invention relates to a writable information recording medium, and, more particularly, to an information recording medium having a recording layer and a reflective layer formed on a substrate having light transmission properties.

2. Description of the Related Art

It is known that conventional writable information recording media use a recording layer essentially consisting of an organic dye, such as cyanine type dye or phthalocyanine type dye.

To write information on such an information recording medium, a laser beam is focused on a minute area of the recording layer so that it is transferred to thermal energy to alter the property of the recording layer, thus accomplishing the information recording (forming pits). To smoothly change the property of the recording layer, the information recording media typically employ a so-called air sandwich structure which is accomplished by preparing two sets of substrate-and-recording-layer laminations each having a recording layer formed on a transparent substrate, and arranging those two sets of lamination structures in such a way that the recording layers face each other.

A write laser beam used for this type of information recording medium is irradiated on this medium from the transparent substrate side to form optically readable pits in the recording layer. A read laser beam for reproducing the recorded data has a lower intensity than the write laser beam. When this read laser is irradiated on the information recording medium, the contrast between a pit-formed portion and a pit-absent portion is read out as an electrical signal.

There is a different type of a medium on which data has been pre-recorded, a so-called ROM (Read Only Memory) type medium. The ROM type media are widely used in the fields of audio recording and information processing. This type of medium however has no writable recording layer mentioned above. More specifically, pre-pits corresponding to data to be reproduced have previously been formed on a plastic substrate by injection molding, and a reflective layer of a metal such as Au, Ag, Cu and Al is formed on the pits-formed substrate, with a protective layer covering the top of the reflective layer. A typical ROM type medium is a so-called CD (Compact Disk). The specifications for recording and reading signals for this CD are standardized, and compact disk players (CD players), which conform to the standards, are widely used as CD reproducing apparatuses.

The aforementioned writable information recording medium is the same as a CD in the use of a laser beam and in its disk shape. There is therefore a strong demand for the development of writable media, which conform to the standards of the CD specifications and can be thus used directly in available CD players. To meet this demand, actual samples have been gradually proposed.

An organic dye, which is contained as the essential component in the recording layer of such a writable information recording medium, does not have a sufficient light resistance. Nitroso compounds having an effect of preventing tenebrescence are used as one means to improve the light resistance.

However, there is a strong demand for media whose recording layer contains a material that is much safer and easier to synthesize than those of nitroso compound and further having an excellent effect of preventing tenebrescence.

SUMMARY OF THE INVENTION

Accordingly, it is an object of the present invention to overcome the aforementioned shortcomings and to provide a writable information recording medium which is very safe to use and has excellent light resistance.

To achieve the foregoing and other objects and in accordance with the object of the present invention, there is provided an information recording medium having a recording layer formed on a substrate and a reflective layer formed on the recording layer, the recording layer containing at least one cyanine dye selected from those represented by the general formulae [I] and [II] given later, and a benzotriazole type compound represented by the general formula [III] also given later.

A specific constitution of the present invention will be described in detail below in conjunction with the accompanying drawings.

DETAILED DESCRIPTION OF THE PREFERRED EMBODIMENT

Figure 1:
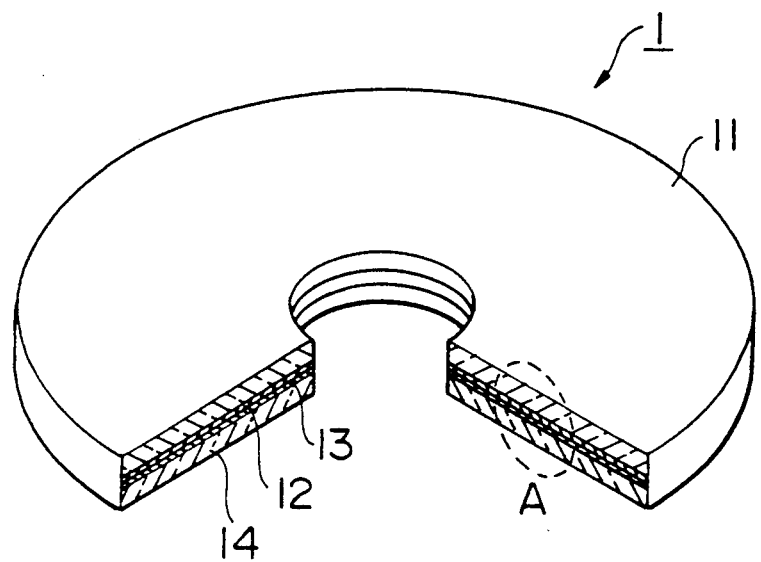
FIG. 1 is a schematic partly cutaway perspective view of an information recording medium according to the present invention.
Figure 2:
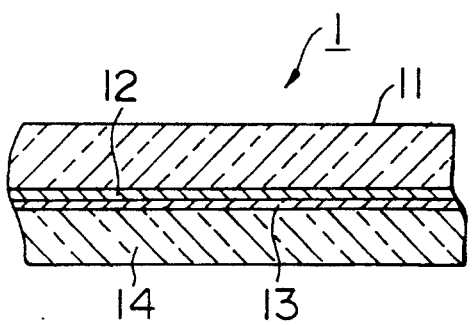
FIG. 2 is a partly enlarged cross section of the cutaway portion in FIG. 1.

An information recording medium 1 according to the present invention has a recording layer 12 formed on a substrate 11 having light transmission property and a light-reflective layer 13 formed on the recording layer 12, with a protective layer 14 disposed on the light-reflective layer 13.

The recording layer 12 formed on the substrate 11 contains at least one type of a cyanine dye selected from those represented by the following general formulae [I] and [II].

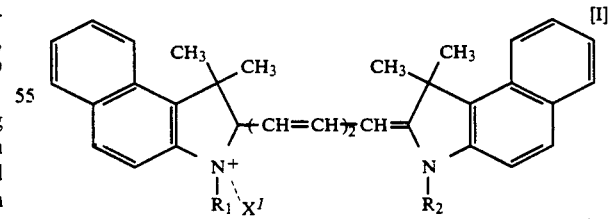

wherein $R_1$ and $R_2$ independently represent an alkyl group having 1 to 8 carbon atoms, preferably 3 to 5 carbon atoms. When the number of carbon atoms exceeds 8, waxing occurs so that this cyanine dye becomes difficult to handle. In formula [I], $X^-$ represents a counter ion which typically includes $ClO_4^-$, $I^-$, $Br^-$ or the like.

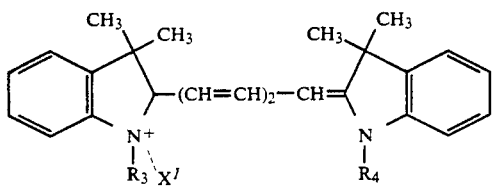

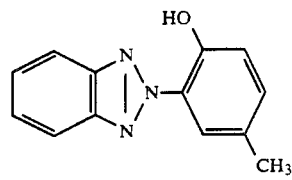

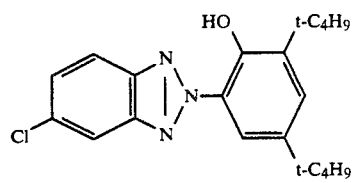

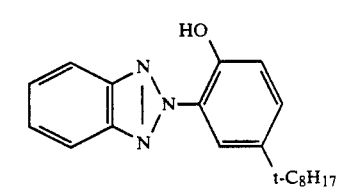

wherein $R_3$ and $R_4$ independently represent an alkyl group having 1 to 8 carbon atoms, preferably 3 to 5 carbon atoms. When the number of carbon atoms exceeds 8, there would occur the same inconvenience as would arise in the case of the general formula [I]. $X^-$ represents a counter ion, which is the same as the one defined for the formula [I].

While cyanine dyes represented by the general formulae [I] and [II] may be used singularly, it is preferable to use a mixture of a cyanine dye represented by the general formula [I] and another cyanine dye represented by the general formula [II] in order to assure high reflectance, recording sensitivity and good modulation of the recorded signals. When a mixture of the cyanine dyes is used, the mixing ratio is 100 to 300 parts by weight of the cyanine dye represented by the general formula [II] with respect to 100 parts by weight of the cyanine dye represented by the general formula [I].

The recording layer 12 further contains a benzotriazole type compound represented by the following general formula [III] to prevent light degradation (fading) of the aforementioned cyanine dye:

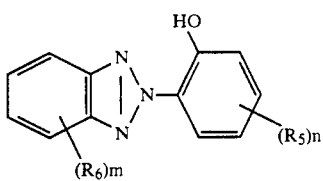

wherein $R_5$ represents a hydrogen, or a substituted or unsubstituted alkyl group having 1 to 8 carbon atoms, preferably 1 to 4 carbon atoms, and $R_6$ represents a halogen or an alkyl group, and n represents one of integers 0 to 4, when n is 2 or more the substituents for $R_5$ and $R_6$ may be the same or different from each other, m also represents one of integers 0 to 4, when m is 2 or more the substituents for $R_5$ and $R_6$ may be the same or different from each other.

A specific example of the benzotriazole type compound include materials represented by the following structural formulae [BT-1], [BT-2] and [BT-3].

Such benzotriazole type compound is contained in an amount of 5 to 50 parts by weight, preferably 20 to 25 parts by weight relative to 100 parts by weight of the aforementioned cyanine dye. When this value exceeds 50 parts by weight, the recording sensitivity undesirably drops, whereas when the value becomes less than 5 parts by weight, the effect of preventing tenebrescence undesirably decreases.

The recording layer may contain a plurality of these benzotriazole type compounds.

The recording layer 12 may further contain a quencher in addition to the benzotriazole type compound, particularly, an Ni complex represented by the following general formula [IV].

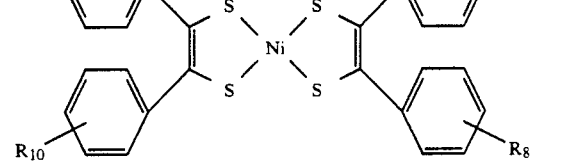

wherein $R_7$ to $R_{10}$ independently represent hydrogen or its substituent. Examples of the substituent include $CH_3O-$, $CH_3OCH_2CH_2O-$, $CH_3COO-$, $(n-C_3H_7)_2N-$, $(C_2H_5)_2N-$ and $Cl-$.

Specific examples of such quenchers include, for example, those represented by the following structural formulae [Q-1] to [Q-4]. Among them, the one represented by the structural formula [Q-1] is preferred.

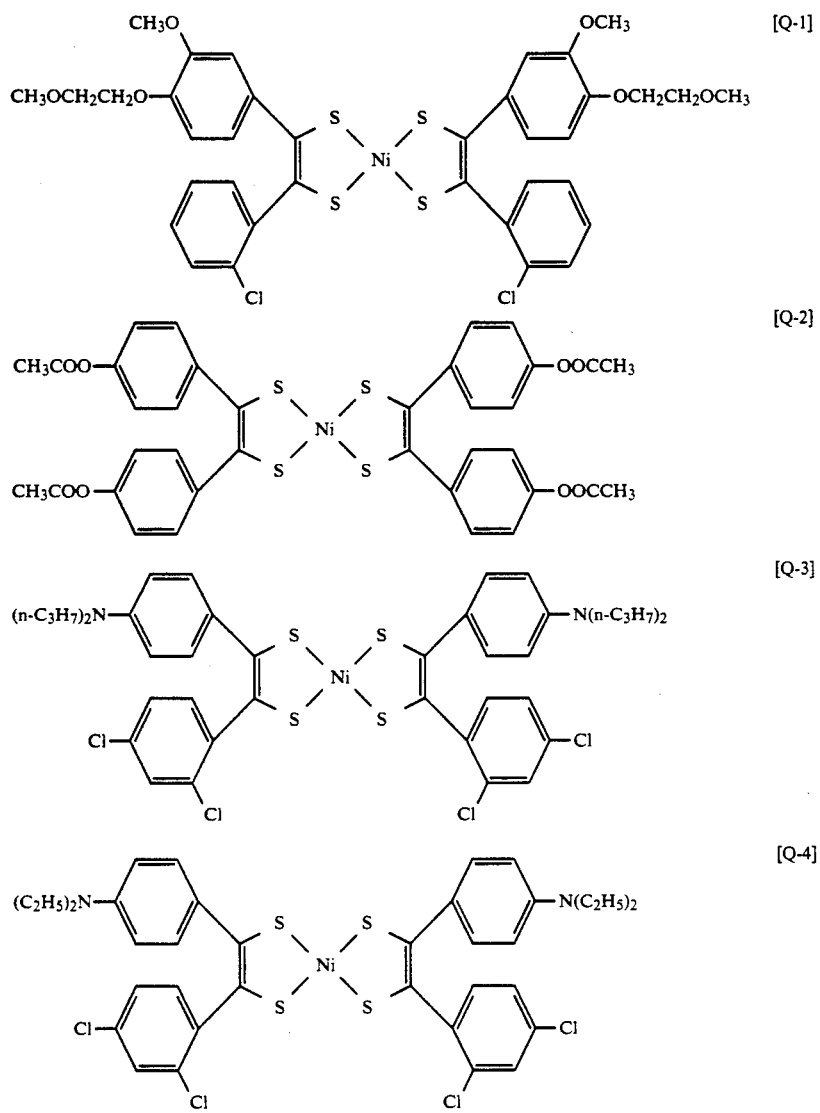

The recording layer 12 containing the aforementioned cyanine dye and benzotriazole type compound is applied on the substrate 11 by typical means such as spin coating.

The thickness of the recording layer 12 to be coated is 30 to 900 nm, preferably 100 to 300 nm. When the thickness becomes less than 30 nm, light absorption is reduced so that the sensitivity in the wavelength of the semiconductor laser lowers, disabling the recording of signals. When the thickness exceeds 900 nm, the dye becomes thick to thereby increase the light absorption while undesirably reducing the reflectance.

Various types of known solvents can be used for coating the recording layer 12; they include diacetone alcohol, ethyl cellosolve, methyl cellosolve, isophorone, methanol and tetrafluoropropanol.

The substrate 11 on which this recording layer 12 is applied, generally, has a disk shape. From the viewpoint of improving the productivity, it is preferable to use an integrally formed injection-molded resin substrate as the substrate 11. This substrate may be formed of a transparent material, such as polycarbonate resins (PC) or polymethyl methacrylate (PMMA). Particularly, it is preferred to use polycarbonate resins (PC) with an average molecular weight of 32,000 to 40,000. The substrate 11 is not limited to such integrally formed injection-molded resin substrate, but may be formed by the 2P (photo-polymer) method. The thickness of the thus formed substrate 11 is about 1.0 to 1.5 mm.

The light-reflective layer 13 is provided on the recording layer 12 coated on the substrate 11. The light-reflective layer 13 is formed of a metal such as Au, Ag, Cu or Al, and the film-formation is carried out by vacuum vapor deposition, sputtering, ion plating or the like. The thickness of the light-reflective layer 13 is about 0.02 to 2.0 μm.

The protective layer 14 is usually provided on the light-reflective layer 13 to protect the recording layer (light-absorbing layer) 12 and the light-reflective layer 13. In general, the protective layer 14 is formed by coating an ultraviolet-hardening resin on the light-reflective layer 13 by spin coating and then irradiating ultraviolet rays on the resultant structure to harden the coated film. Other possible materials for the protective layer 14 include epoxy resins, acrylic resins, silicone resins and urethane resins. The thickness of the protective layer 14 is generally about 0.1 to 100 μm.

An intermediate layer may be provided between the substrate 11 and the light-absorbing layer 12 to protect the substrate 11 from the solvent. An intermediate layer may be provided between the light-absorbing layer 12 and the light-reflective layer 13 to improve efficiency for the light absorption.

Incidentally, the wavelength of light used for information recording and reproduction in the present invention is about 780 to 830 μm.

The present invention will be described in more detail by way of specific examples.

Preparation of Sample 1 of the Present Invention

The following two types of cyanine dyes [D-1] and [D-2] were used as the cyanine dyes contained in the recording layer, and the aforementioned material [BT-1] was used as the benzotriazole type compound. The mixing ratio (parts by weight) of these components was [D-1]: [D-2]: [BT-1]=100: 180: 65.

Cyanine dye [D-1]

In the aforementioned general formula [I], $R_1$ and $R_2$ respectively were n-$C_4H_7$, and $X^-$ was $ClO_4^-$.

Cyanine dye [D-2]

In the aforementioned general formula [II], $R_3$ and $R_4$ respectively were n-$C_3H_9$, and $X^-$ was $I^-$.

Those dyes and benzotriazole type compound were dissolved in a solvent (1000 parts by weight) of ethyl cellosolve, and the resulting solution was coated 120 nm thick on an acrylic substrate 120 mm in diameter and 1.2 mm in thickness.

Preparation of Sample 2 of the Present Invention

Sample 2 was prepared in the same manner as Sample 1 excepting that the benzotriazole type compound [BT-1] was substituted with [BT-2].

Preparation of Sample 3 of the Present Invention

The Sample 3 was prepared in the same manner as Sample 1 excepting that the benzotriazole type compound [BT-1] was substituted with [BT-3].

Preparation of Sample 4 of the Present Invention

Sample 4 was prepared in the same manner as Sample 1 excepting that the aforementioned quencher [Q-1] was added to the composition of the recording layer used in Sample 1. The mixing ratio (parts by weight) of the components was [D-1]:[D-2]:[BT-1]:[Q-1]=100:180 65:40.

Preparation of Sample 5 of the Present Invention

Sample 5 was prepared in the same manner as Sample 2 excepting that the aforementioned quencher [Q-1] was added to the composition of the recording layer used in Sample 2. The mixing ratio (parts by weight) of the components was [D-1]:[D-2]:[BT-2]:[Q-1]=100: 180 65:40.

Preparation of Sample 6 of the Present Invention

Sample 6 was prepared in the same manner as Sample 3 excepting that the aforementioned quencher [Q-1] was added to the composition of the recording layer used in Sample 3. The mixing ratio (parts by weight) of the components was [D-1]:[D-2]:[BT-2]:[Q-1]=100: 180 65:40.

Preparation of Comparative Sample 1]

Comparative Sample 1 was prepared in the same manner as in Sample 1 except that the benzotriazole type compound [BT-1] was replaced with bis(1,2,2,6,6-pentamethyl-4-piperidyl)-2-(3,5-di-t-butyl-4-hydroxybenzyl)-2-n-butyl malonate compound represented by the following structural formula [C-1].

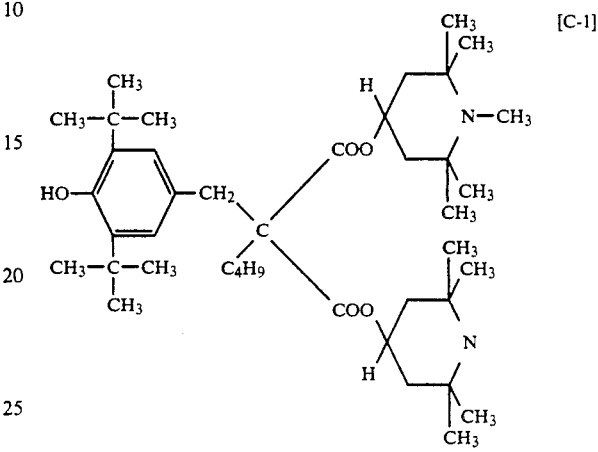

Preparation of Comparative Sample 2

Comparative Sample 2 was prepared in the same manner as in Sample 1 except that the benzotriazole type compound [BT-1] was replaced with bis(2,2,6,6-tetramethyl-4-piperidyl)sebacate compound represented by the following structural formula [C-2].

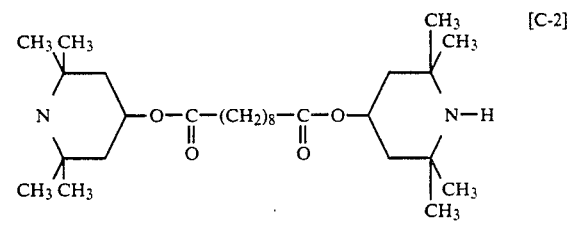

Preparation of Comparative Sample 3

Comparative Sample 3 was prepared in the same manner as in Sample 1 except that the benzotriazole type compound [BT-1] was replaced with a compound represented by the following structural formula [C-3].

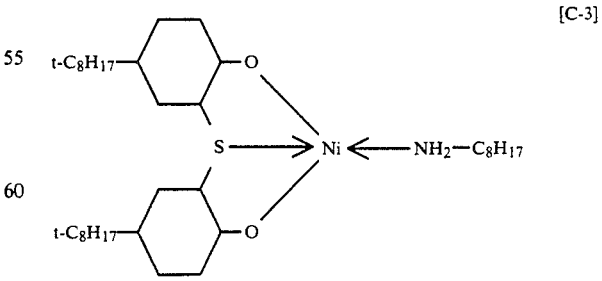

Preparation of Comparative Sample 4

Comparative Sample 4 was prepared in the same manner as in Sample 1 except that the benzotriazole type compound [BT-1] was replaced with a compound represented by the following structural formula [C-4].

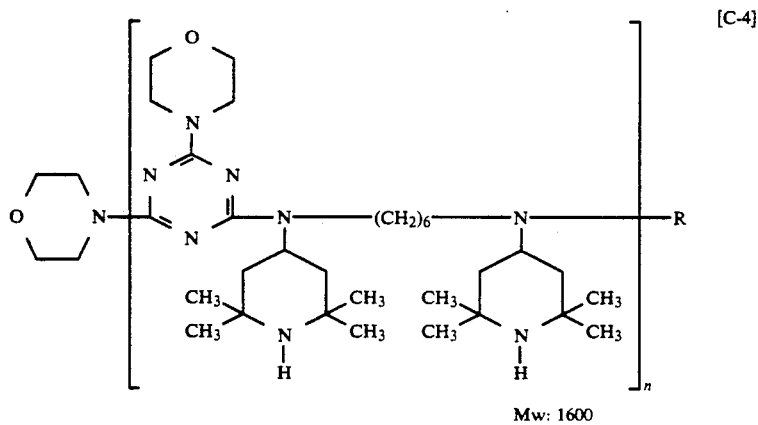

[C-4]

Mw: 1600

Preparation of Comparative Sample 5

Comparative Sample 5 was prepared in the same manner as in Sample 1 except that the benzotriazole type compound [BT-1] was replaced with a compound represented by the following structural formula [C-5].

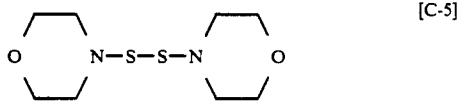

[C-5]

Preparation of Comparative Sample 6

Comparative Sample 6 was prepared in the same manner as in Sample 1 except that the benzotriazole type compound [BT-1] was replaced with a compound represented by the following structural formula [C-6].

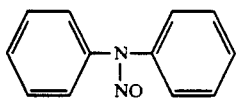

[C-6]

Preparation of Comparative Sample 7

Comparative Sample 7 was prepared in the same manner as in Sample 1 except that the benzotriazole type compound [BT-1] was replaced with a compound represented by the following structural formula [C-7].

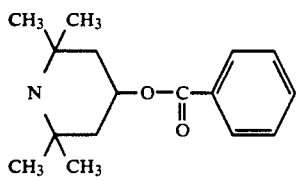

[C-7]

Preparation of Comparative Sample 8

Comparative Sample 8 was prepared in the same manner as in Sample 1 except that the benzotriazole type compound [BT-1] was eliminated.

Preparation of Comparative Sample 9

Comparative Sample 9 was prepared in the same manner as in Sample 2 except that the benzotriazole type compound [BT-1] was eliminated.

Light resistance test was conducted for the above Samples 1 and 2 and Comparative Samples 1 to 9 in the following manner.

Light Resistance Test

Light from a cool white fluorescent lamp (40 W) was continuously irradiated on those samples for 30 hours at a distance of 10 cm.

Then, the transmittance in each sample was measured and the fading ratio (%)=(transmittance after 30 hours/initial transmittance)×100 was computed. This value of the fading ratio was evaluated as follows: 0 to less than 7% marked "o" (very good), 7 to less than 10% marked "Δ" (not good enough) and above 10% marked "X" (impractical).

TABLE 1

| Sample No. | Result of Light Resistance Test |
|---|---|
| Sample 1 of the present invention | ◯ (6.4%) |
| Sample 2 of the present invention | ◯ (4.5%) |
| Sample 3 of the present invention | ◯ (5.7%) |
| Sample 4 of the present invention | ◯ (6.2%) |
| Sample 5 of the present invention | ◯ (4.4%) |
| Sample 6 of the present invention | ◯ (5.4%) |
| Comparative Sample 1 | Δ (7.5%) |
| Comparative Sample 2 | X (14.0%) |
| Comparative Sample 3 | Δ (7.3%) |
| Comparative Sample 4 | X (12.8%) |
| Comparative Sample 5 | Δ (7.0%) |
| Comparative Sample 6 | Δ (8.9%) |
| Comparative Sample 7 | X (10.2%) |
| Comparative Sample 8 | X (10.0%) |
| Comparative Sample 9 | X (9.7%) |

The values in the parentheses indicate the fading ratios.

What is claimed is:

1. An information recording medium having a recording layer formed on a substrate and a reflective layer formed on said recording layer, said recording layer containing at least one cyanine dye selected from those represented by the following general formulae [I] and [II] given below, and a benzotriazole type compound represented by the following general formula [III]:

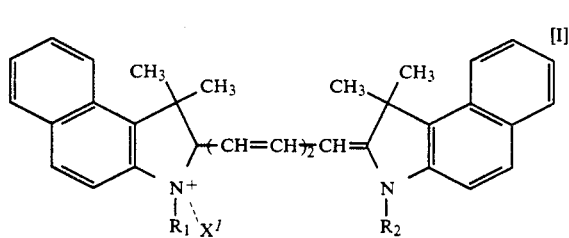

wherein $R_1$ and $R_2$ independently represent an alkyl group having 1 to 8 carbon atoms, and $X^-$ represents a counter ion;

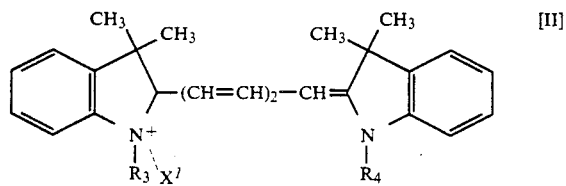

wherein $R_3$ and $R_4$ independently represent an alkyl group having 1 to 8 carbon atoms, and $X^-$ represents a counter ion; and

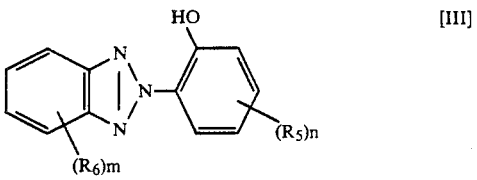

wherein $R_5$ represents a hydrogen or a substituted or unsubstituted alkyl group, and $R_6$ represents a halogen or an alkyl group, m and n independently represent integers 0 to 4, when each of m and n is 2 or more the substituents for $R_5$ and $R_6$ may be the same or different from each other.

2. The information recording medium according to claim 1, wherein said benzotriazole type compound is contained in an amount of 5 to 50 parts by weight relative to 100 parts by weight of said cyanine dye.

3. The information recording medium according to claim 1 wherein said recording layer further contains a quencher of an Ni complex.

4. The information recording medium according to claim 2, wherein said recording layer further contains a quencher of an Ni complex.

* * * * *